Nov. 29, 1927.
W. C. HATFIELD
1,650,711
RESERVE SUPPLY DEVICE FOR TANKS
Filed April 8, 1927
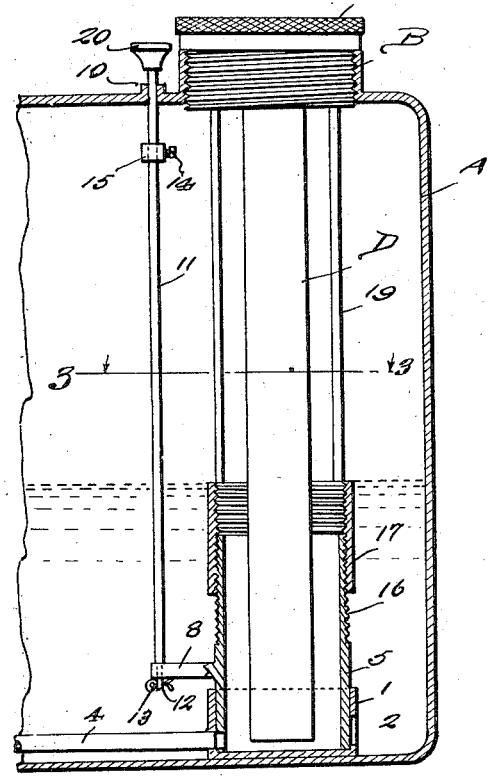
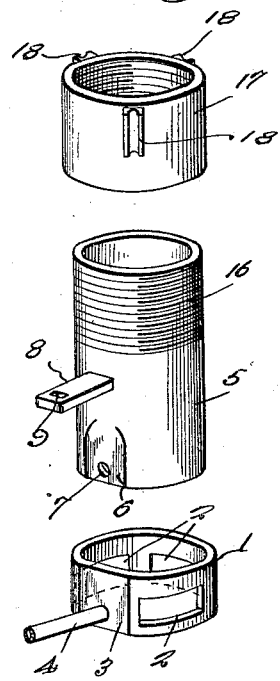
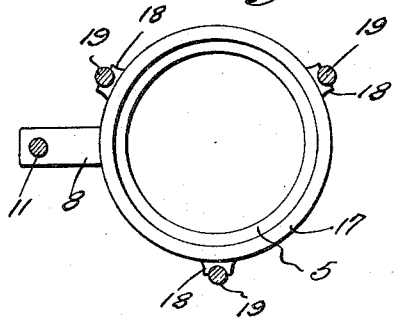
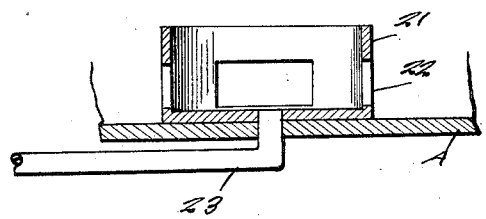
W. C. Hatfield
INVENTOR
BY Victor J. Evans
ATTORNEY Patented Nov. 29, 1927.

1,650,711

UNITED STATES PATENT OFFICE.

WILSON C. HATFIELD, OF GREENWOOD, DELAWARE.

RESERVE-SUPPLY DEVICE FOR TANKS.

Application filed April 8, 1927. Serial No. 182,145.

This invention relates to valves, and its primary object is to provide a reserve supply valve for fuel tanks of vehicles and the like, of a type whereby a predetermined quantity of fuel can be retained in the fuel tank for emergency use and released at the will of the operator.

A further object of the invention is to provide a reserve fuel supply device for tanks, that is extremely simple in construction, inexpensive to manufacture and is capable of adjustment so that various quantities of fuel can be retained in a tank equipped with the device, the quantity retained being in accordance with the desires of the user.

Another object of the invention is to provide a reserve fuel supply device for vehicle fuel tanks that is capable of adjustment and operation in an easy and expeditious manner.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a vertical sectional view taken through a fuel tank of a vehicle, equipped with my device and showing the same in section and in elevation.

Figure 2 shows perspective views of some of the parts of my device.

Figure 3 is a sectional view taken on line 3—3 of Figure 1 looking in the direction of the arrows.

Figure 4 is a vertical sectional view taken through a slightly modified form.

Referring to the drawings in detail the letter A indicates a fuel tank formed with the usual interiorly threaded neck B to threadedly accommodate the cap C which forms a part of a gage construction D. The above construction is conventional and is generally included as regular equipment on fuel tanks of motor vehicles, while my invention includes a cup 1 which is soldered or otherwise secured in the bottom of the fuel tank A as shown in Figure 1, and this cup is provided with a plurality of slots 2 formed in its side wall, for a purpose which will be presently apparent. The cup 1 is provided with a flat surface 3 which has arranged adjacent its lower edge an opening to accommodate one end of a fuel line 4 which is adapted to be arranged in communication with the vacuum tank or carburetor of a vehicle.

The cup 1 is disposed directly below the neck B and arranged in said cup for vertical movement is a sleeve 5 having a flat surface 6 adapted to engage with the inner side of the flat surface 3 of the cup so as to prevent rotation of the sleeve in the cup as will be readily apparent. The flat surface 6 of the sleeve is provided with an opening 7 adapted to register with the opening of the flat surface 3 when the sleeve 5 is disposed in its normal position as shown in Figure 1, and formed integral with and projecting laterally from said sleeve above the flat surface 6 thereof, is an arm 8 provided with a slot 9 adjacent its outer end.

Arranged for slidable movement through an opening formed in the top of the tank A and through a boss 10 is a rod 11 which has its lower end reduced as at 12 to be received in the slot 9 and is secured therein through the instrumentality of a cotter pin 13. In order to limit the upward movement of the rod 11 there is adjustably secured thereon through the instrumentality of a set screw 14, a collar 15 which of course will engage the inner side of the top of the tank when the rod is arranged as will be readily apparent.

The sleeve 5 is threaded for a portion of its length as at 16 to threadedly receive an adjusting collar 17 which has formed on its outer surface channel guides 18 which are adapted to accommodate vertically disposed rods 19 formed with the cap C having their respective ends fixed to the top and bottom of the tank A. The upper ends of the rods 19 are offset in opposed relation with respect to each other.

From the above description and disclosure of the drawings, it will be obvious that the sleeve 5 is adapted to be vertically moved in its cup 1 through the instrumentality of the rod 11 which has formed on its upper end a knob 20 for the purpose of operating the same, and when the sleeve 5 is in its normal position, it covers the slots 2 in a manner to form a tight joint and prevent fuel from passing into the sleeve through the slots 2. However, when the rod 11 is pulled it will elevate the sleeve 5 above the slots 2 which will result in the passage of the fuel through the slot and thence into the fuel line 4. The collar 17 can be adjusted on the thread 16 of the sleeve so as to vary the quantity of reserved fuel, as it will be apparent that when the collar is in its lowermost position. the reserved quantity of fuel is much less than when the collar is in its uppermost position. The sleeve 5 is preferably provided with graduations not shown so that the quantity of reserved fuel can be regulated in accordance with the desires of the user and in order to regulate the adjusting collar 17, the cap C is removed, the collar 15 is then made loose on the rod 11 so that the rod can be elevated to an extent to place the collar in convenient reach whereby it can be rotated on the thread 16. When the sleeve 5 is in its normal position as shown in Figure 1, the level of the reserve fuel will be at the top of the collar 17.

In Figure 4 I have shown a slightly modified form of cup which is indicated by the reference numeral 21. The cup in this form is also provided with slots 22 in its side walls, but the fuel line 23 passes through the bottom of the tank A and is connected with the bottom of the cup 21.

While I have shown my device associated with the gage opening of the tank, it will be obvious it can be associated with the filling spout thereof or at any other appropriate place in the tank without departing from the spirit of the invention.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. The combination with a tank, of a reserve supply device associated with said tank and comprising a slotted cup fixed in the bottom of said tank, a sleeve mounted for vertical slidable movement in said cup and controlling the slots therein, means carried by said sleeve for regulating the amount of reserve fuel, a pipe line in communication with said cup, and a rod secured to said sleeve and being mounted for slidable movement through said tank, a knob on the outer end of said rod and a collar on said rod to limit the outer movement thereof.

2. The combination with a fuel tank, of a reserve fuel supply device comprising a cup fixed to the bottom of said tank and being formed in its sides with a plurality of slots, a flat portion included in said cup and being provided with an opening, a pipe line connected with said opening, a sleeve threaded for a portion of its length and mounted for slidable movement in said cup in a manner to open and close the slots, means for moving said sleeve and having a portion thereof arranged exteriorly of said tank, means to limit the movement of said sleeve and being adjustably fixed to the first mentioned means, means formed on said sleeve and associated with the flat portion to prevent rotation of the sleeve, and an adjusting collar received on the threaded portion of said sleeve for regulating the amount of reserve fuel in said tank.

3. The combination with a fuel tank, of a reserve fuel device for said tank and comprising a slotted cup secured to the bottom of said tank and rising therefrom, said cup being provided with slots in its side wall, a threaded sleeve mounted for vertical movement in said cup and being adapted to control the slots therein, an arm laterally extending from said sleeve, a rod secured to said arm and passing through the top of said tank, means adjustably secured to said rod to limit its movement, a knob on the upper end of said rod, a cup threadedly mounted on the upper end of said sleeve and being adapted to regulate the quantity of reserve fuel in said tank, and a fuel line in communication with said cup.

In testimony whereof I affix my signature.

WILSON C. HATFIELD.